United States Patent
Mukasa et al.

(10) Patent No.: US 8,410,244 B2
(45) Date of Patent: Apr. 2, 2013

(54) VIBRATION-DAMPING FILM

(75) Inventors: Kazuaki Mukasa, Kanagawa (JP); Takuya Minezaki, Kanagawa (JP); Akifumi Tiba, Kanagawa (JP); Kenji Harada, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 13/382,361

(22) PCT Filed: Jul. 5, 2010

(86) PCT No.: PCT/JP2010/061425
§ 371 (c)(1),
(2), (4) Date: Apr. 25, 2012

(87) PCT Pub. No.: WO2011/004797
PCT Pub. Date: Jan. 13, 2011

(65) Prior Publication Data
US 2012/0202038 A1 Aug. 9, 2012

(30) Foreign Application Priority Data

Jul. 6, 2009 (JP) ................................ 2009-160100

(51) Int. Cl.
*C08G 64/00* (2006.01)
*C08G 63/02* (2006.01)

(52) U.S. Cl. ........................................................ 528/495
(58) Field of Classification Search .................. 428/220; 528/271, 272
See application file for complete search history.

(56) References Cited

U.S. PATENT DOCUMENTS

| 2010/0179267 A1 | 7/2010 | Mukasa et al. |
| 2010/0234509 A1 | 9/2010 | Minezaki et al. |

FOREIGN PATENT DOCUMENTS

| JP | 2006-052377 | 2/2006 |
| JP | 2007-056165 | 3/2007 |
| JP | 2008-189854 | 8/2008 |
| WO | 2008/001844 | 2/2008 |

OTHER PUBLICATIONS

Search Report from International Application No. PCT/JP2010/061425, mail date Sep. 28, 2010.

*Primary Examiner* — Terressa Boykin
(74) *Attorney, Agent, or Firm* — Greenblum & Bernstein, P.L.C.

(57) ABSTRACT

Vibration damping film comprising a composition obtained by dispersing titanium dioxide (Y) and mica flakes (Z) in a polyester resin (X) comprising dicarboxylic acid units and diol units, satisfying conditions (I) to (III), and having a thickness in the range of 20 to 200 μm : (I) Content of polyester resin (X), titanium dioxide (Y) and mica flakes (Z) in the composition is in the range of 35 to 60% by mass, in the range of 5 to 15% by mass and in the range of 30 to 55% by mass, respectively, (II) Average particle diameter of the mica flakes (Z) in the resin composition is in the range of 5 to 80 μm, and (III) Elongation at failure point of the resin composition measured according to JIS K7127 is in the range of 30 to 70%.

11 Claims, No Drawings

VIBRATION-DAMPING FILM

TECHNICAL FIELD

The present invention relates to a vibration damping film mainly composed of a polymeric material.

BACKGROUND ART

Vibration damping materials have been generally used to absorb vibration energy in the places where vibration occurs such as vehicles, railway cars, aircraft, household appliances, office automation equipment, precision apparatuses, building equipment, civil engineering equipment, shoes, sports goods.

Patent Document 1, for example, discloses a polyester resin composition having a partial structure in which the number of carbon atoms between the ester linkages of the main chain is an odd number, as a damping material to absorb the vibration energy. This polyester resin composition is excellent in the damping performance around room temperature and promising as a damping material. However, when carbon or mica powders and the like, which are electroconductive materials, are dispersed in the polyester resin, it is difficult to produce the damping material with the thickness less than 200 μm and it cannot be used as a damping material for film application.

Rubber materials such as butyl rubber and nitrile rubber (NBR), which are excellent in processability, mechanical strength and material cost, are also being used as a vibration damping material in a wide range. However, although these rubber materials have the best damping property (performance to insulate or relax the transmission of vibration energy) among common polymeric materials, the damping property (property to absorb vibration energy) of the rubber materials is not sufficient to use them alone. Therefore, the rubber materials cannot exhibit sufficient damping property when used as the damping material for, for example, film application.

PRIOR ART DOCUMENTS

[Patent Documents]
 [Patent document 1] JP-A-2006-052377

DISCLOSURE OF THE INVENTION

[Problem to be Solved by Invention]

Under the above-mentioned circumstances, an object of the present invention is to provide a lightweight vibration damping film which can be easily produced and exhibits the excellent vibration damping property as well as general versatility.

[Means for Solving the Problem]

As a result of intensive study to achieve such purposes, the present inventors have found that the above-mentioned purpose was achieved by using a resin composition obtained by dispersing titanium dioxide and mica flakes in a polyester resin composed of a dicarboxylic acid constitutional units and a diol constitutional units, wherein the elongation at failure point measured according to JIS K7127 is 30 to 70%. The present invention has been completed based on these findings.

Thus, the present invention is a vibration damping film as follows.

A vibration damping film containing a resin composition obtained by dispersing titanium dioxide (Y) and mica flakes (Z) in a polyester resin (X) composed of a dicarboxylic acid constitutional units and a diol constitutional units, wherein the resin composition satisfies all of the following conditions (I) to (III), and wherein the film has a thickness in the range of 20 to 200 μm.

(I) Content of polyester resin (X), titanium dioxide (Y) and mica flakes (Z) in the resin composition is in the range of 35 to 60% by mass, in the range of 5 to 15% by mass and in the range of 30 to 55% by mass, respectively.

(II) Average particle diameter of the mica flakes (Z) in the resin composition is in the range of 5 to 80 μm.

(III) Elongation at failure point of the resin composition measured according to JIS K7127 is in the range of 30 to 70%.

[Effects of Invention]

The vibration damping film of the present invention can be easily formed into the thickness range of 20 to 200 μm. This film is lightweight and exhibits excellent vibration damping property.

Furthermore, since the vibration damping film of the present invention contains titanium dioxide and mica flakes and does not need to use carbon powder and the like, it can be used with general versatility in application and places where various color tones are required.

Therefore, the vibration damping film of the present invention can be widely used for places where vibration occurs, such as vehicles, railway cars, aircraft, ships, household appliances, office automation equipment, precision apparatuses, building equipment, civil engineering equipment, household equipment, medical devices, shoes, sports goods, etc. In addition, the vibration damping film of the present invention can be applied as a vibration damping label for cassette tapes, hard disks, handy cameras, digital cameras, etc.

MODES FOR CARRYING OUT THE INVENTION

Hereinafter, the present invention will be described in detail.

The vibration damping film of the present invention contains a resin composition obtained by dispersing titanium dioxide (Y) and mica flakes (Z) in a polyester resin (X) composed of a dicarboxylic acid constitutional units and a diol constitutional units, wherein the elongation at failure point of the resin composition measured according to JIS K7127 is in the range of 30 to 70% as one of the requirements (condition III).

Note that the elongation at failure point is an average value of each elongation of five tensile tests for reed shape test pieces with the dimension of 10 mm×150 mm and 1.0 mm thick under the conditions of a tensile rate of 50 mm/min and an intergrip distance of 50 mm measured after conditioning at 23° C. and 50% RH for 80 hrs or more.

With the elongation at failure point of the resin composition for the vibration damping film 30% or more, a film of 20 to 200 μm thick can be easily formed. With the elongation at failure point of 70% or less, sticking of the resin composition can be prevented. Therefore, the film can be produced by forming without practical problems.

The polyester resin (X), which is the resin component of the vibration damping film of the present invention, is composed of a dicarboxylic acid constitutional units and a diol constitutional units, wherein a ratio of a total of the number of the dicarboxylic acid constitutional units having an odd number of carbon atoms in the main chain ($A_1$) plus the number of the diol constitutional units having an odd number of carbon atoms in the main chain ($B_1$) with respect to a total of the number of total dicarboxylic acid constitutional units ($A_0$) plus the number of total diol constitutional units ($B_0$), i.e., $[(A_1+B_1)/(A_0+B_0)]$ is preferably in a range of 0.5 to 1.0. With the above-mentioned ratio $[(A_1+B_1)/(A_0+B_0)]$ in this range, the vibration damping property of the resin around room temperature can be enhanced.

As used herein, the above-mentioned term "the number of carbon atoms in the main chain of the dicarboxylic acid constitutional unit (or the diol constitutional unit)" refers to the number of carbon atoms present in the shortest path along the main chain of the polyester resin in each monomer unit intervened between one ester linkage (—C(=O)—O—) and the next ester linkage. Note that the number of the constitutional units of each component can be calculated from the ratio of the integrated value obtained from the measurement result of $^1$H-NMR spectra described below.

In the polyester resin (X) of the present invention, the ratio of a total of the number of the dicarboxylic acid constitutional units having an odd number of carbon atoms in the main chain ($A_1$) plus the number of the diol constitutional units having an odd number of carbon atoms in the main chain ($B_1$) with respect to a total of the number of total dicarboxylic acid constitutional units ($A_0$) plus the number of total diol constitutional units ($B_0$), i.e., $[(A_1+B_1)/(A_0+B_0)]$ is preferably in a range of 0.7 to 1.0. Moreover, the number of carbon atoms of the dicarboxylic acid constitutional unit in the main chain and the number of carbon atoms in the diol constitutional unit in the main chain are preferably odd numbers of 1, 3, 5, 7, and 9.

Examples of the dicarboxylic acid constitutional units having an odd number of carbon atoms in the main chain in the polyester resin (X) include a constitutional units derived from isophthalic acid, malonic acid, glutaric acid, pimelic acid, azelaic acid, undecanedioic acid, brassylic acid and 1,3-cyclohexanedicarboxylic acid, etc. Of those, the constitutional units derived from isophthalic acid, azelaic acid and 1,3-cyclohexanedicarboxylic acid are preferred, and at least either of the constitutional unit derived from isophthalic acid or azelaic acid is more preferred. The polyester resin (X) may contain one or more kinds of constitutional units derived from the above-mentioned dicarboxylic acids. Further, if two or more kinds of constitutional units are contained, it is preferable that those derived from isophthalic acid and azelaic acid are contained.

Examples of the diol constitutional units having an odd number of carbon atoms in the main chain in the polyester resin (X) include constitutional units derived from 1,3-propanediol, 1,3-butanediol, 2-methyl-1,3-propanediol, 1,3-pentanediol, 1-methyl-1,3-butanediol, 2-methyl-1,3-butanediol, neopentyl glycol, 1,3-hexanediol, 3-methyl-1,3-butanediol, 1,5-pentanediol, 2-methyl-1,5-pentanediol, 3-methyl-1,5-pentanediol, 1,5-hexanediol, 2-ethyl-1,5-pentanediol, 2-propyl-1,5-pentanediol, m-xylene glycol, 1,3-cyclohexanediol and 1,3-bis(hydroxymethyl)cyclohexane. Of those, the constitutional units derived from 1,3-propanediol, 1,3-butanediol, 2-methyl-1,3-propanediol, neopentyl glycol, 1,5-pentanediol, m-xylene glycol, and 1,3-cyclohexanediol are preferred, and the constitutional units derived from 1,3-propanediol, 1,5-pentanediol, 2-methyl-1,3-propanediol, 1,3-butanediol and neopentyl glycol are more preferred. The polyester resin (X) may contain one or more kinds of constitutional units derived from the above-mentioned diols.

In addition, in the vibration damping film of the present invention, the ratio ($A_1/A_0$) of the number of the dicarboxylic acid constitutional units having an odd number of carbon atoms in the main chain ($A_1$) with respect to the number of total dicarboxylic acid constitutional units ($A_0$) in the polyester resin (X) is preferably in the range of 0.5 to 1.0, and more preferably in the range of 0.7 to 1.0.

Furthermore, in the vibration damping film of the present invention, the ratio ($B_1/B_0$) of the number of constitutional units derived from diol having an odd number of carbon atoms in the main chain ($B_1$) with respect to the number of total diol constitutional units ($B_0$) in the polyester resin (X) is preferably in the range of 0.5 to 1.0, and more preferably in the range of 0.7 to 1.0.

With the above-mentioned ratios ($A_1/A_0$) and ($B_1/B_0$) in the range of 0.5 to 1.0, the vibration damping property of the resin around room temperature can be further enhanced.

In the vibration damping film of the present invention, the polyester resin (X) preferably has the intrinsic viscosity measured in a mixed solvent of trichloroethane and phenol (mass ratio of the mixture: trichloroethane/phenol=40/60) at 25° C. in the range of 0.2 to 2.0 dL/g (1) and has the heat generation value based on the exothermic peak by crystallization under the conditions of decreasing temperature measured with a differential scanning calorimeter of 5 J/g or less (2). By satisfying the above-mentioned (1) and (2), higher vibration damping property can be attained.

More preferably, the above-mentioned intrinsic viscosity is in the range of 0.4 to 1.5 dL/g and the above-mentioned heat generation value is 3 J/g or less.

In addition to the dicarboxylic acid constitutional units and the diol constitutional units described above, the polyester resin (X) to be used in the present invention may further contain other constitutional units in amounts not adversely affecting the effects of the invention. The types of other constitutional units are not particularly limited, and the polyester resin may contain constitutional units derived from any of dicarboxylic acids and their esters (referred to as "other dicarboxylic acids"), diols (referred to as "other diols"), and hydroxycarboxylic acids and their esters (referred to as "other hydroxycarboxylic acids") capable of forming a polyester resin.

Examples of the above-mentioned other dicarboxylic acids include dicarboxylic acids or dicarboxylates such as terephthalic acid, orthophthalic acid, 2-methylterephthalic acid, 2,6-naphthalenedicarboxylic acid, succinic acid, adipic acid, suberic acid, sebacic acid, dodecanedioic acid, 1,4-cyclohexanedicarboxylic acid, decalindicarboxylic acid, norbornanedicarboxylic acid, tricyclodecanedicarboxylic acid, pentacyclododecanedicarboxylic acid, isophoronedicarboxylic acid and 3,9-bis (2-carboxylethyl) -2,4,8,10-tetraoxaspiro [5.5] undecane; and tri- or higher valent polycarboxylic acids such as trimellitic acid, trimesic acid, pyromellitic acid and tricarbarylic acid or their derivatives.

Examples of the above-mentioned other diols include aliphatic diols such as ethylene glycol, 1,2-propylene glycol, 2-methyl-1,2-propanediol, 1,4-butanediol, 1,6-hexanediol, 2,5-hexanediol, diethylene glycol, and triethylene glycol; polyether compounds such as polyethylene glycol, polypropylene glycol and polybutylene glycol; tri- or higher valent polyhydric alcohols such as glycerin, tirmethylol propane and pentaerythritol; alicyclic diols such as 1,3-cyclohexane dimethanol, 1,4-cyclohexane dimethanol, 1,2-decahydronaphthalene dimethanol, 1,3-decahydronaphthalene dimethanol, 1,4-decahydronaphthalene dimethanol, 1,5-decahydronaphthalene dimethanol, 1,6-decahydronaphthalene dimethanol, 2,7-decahydronaphthalene dimethanol, tetralin dimethanol, norbornane dimethanol, tricyclodecane dimethanol, 5-methylol-5-ethyl-2-(1,1-dimethyl-2-hydroxyethyl)-1,3-dioxane, pentacyclodecane dimethanol and 3,9-bis(1,1-dimethyl-2-hydroxyethyl)-2,4,8,10-tetraoxaspiro [5.5]undecane; alkyleneoxide adducts of bisphenols such as 4,4'-(1-methylethylidene)bisphenol, methylenebisphenol (bisphenol F), 4,4'-cyclohexylidene bisphenol (bisphenol Z), and 4,4'-sulfonylbisphenol (bisphenol S); and alkyleneoxide adducts of aromatic dihydroxy compounds such as hydroquinone, resorcin, 4,4'-dihydroxybiphenyl, 4,4'-dihydroxydiphenyl ether and 4,4'-dihydroxydiphenylbenzophenone.

Examples of the above-mentioned other hydroxycarboxylic acids include hydroxybenzoic acid, dihydroxybenzoic acid, hydroxyisophthalic acid, hydroxyacetic acid, 2,4-dihydroxyacetophenone, 2-hydroxyhexadecanoic acid, 12-hydroxystearic acid, 4-hydroxyphthalic acid, 4,4'-bis(p-hydroxyphenyl)pentanoic acid and 3,4-dihydroxycinnamic acid.

There is no limitation in the method of producing the polyester resin (X) used in the present invention, and conventionally known methods can be employed. In general, the polyester resin is produced by polycondensation of monomers as raw materials. For example, transesterification or direct esterification conducted by a melt polymerization method or a solution polymerization method can be mentioned. In those methods, there may be used conventionally known transesterification catalysts, esterification catalysts, etherification inhibitors, polymerization catalysts used for polymerization, and stabilizers such as heat stabilizers and light stabilizers, and polymerization adjusters.

Mentioned as the above-mentioned transesterification catalysts are compounds containing metals such as manganese, cobalt, zinc, titanium, and calcium. Mentioned as the above-mentioed esterification catalysts are compounds containing metals such as manganese, cobalt, zinc, titanium and calcium. Mentioned as the above-mentioned etherification inhibitors are amine compounds and the like.

Examples of the above-mentioned polycondensation catalysts include compounds containing metals such as germanium, antimony, tin and titanium, and more particularly, germanium (IV) oxide; antimony (III) oxide, triphenyl stibine and antimony (III) acetate; tin (II) oxide; titanates such as titanium (IV) tetrabutoxide, titanium (IV) tetraisopropoxide and titanium (IV) bis(acetylacetonato)diisopropoxide. It is also effective to add, as a heat stabilizer, various phosphorus compounds such as phosphoric acid, phosphorous acid and phenylphosphonic acid. In addition, light stabilizers, antistatic agents, lubricants, antioxidants, mold release agents, etc., maybe added. Examples of the dicarboxylic acid components as a raw material may include, in addition to dicarboxylic acids from which the above-mentioned dicarboxylic acid constitutional units are derived, their dicarboxylic acid derivatives such as dicarboxylate, dicarboxylic chloride, active acyl derivative and dinitrile.

The vibration-damping film of the present invention contains a resin composition obtained by dispersing titanium dioxide (Y) and mica flakes (Z) in the above-mentioned polyester resin (X) for the purpose to enhance absorption of vibration energy.

The form of the titanium dioxide (Y) dispersed in the polyester resin (X) is not particularly limited, and titanium dioxide containing rutile type only or anatase type only and titanium dioxide containing a mixture of rutile type and anatase type may be used. In addition, as a surface coating agent for suppressing the photocatalytic activity of titanium dioxide, surface treatment agents such as aluminum oxide, silicon oxide, zirconium oxide, zinc oxide and the like are exemplified. Electroconductive titanium dioxide containing electroconductive powders can also be used for the vibration damping film of the present invention. Titanium dioxide (Y) having an average particle diameter (volume-average particle diameter) measured by laser diffractometry in the range of 0.01 to 0.5 μm is preferred.

Although there is no particular limitation on the kind of the mica flakes (Z) dispersed in the polyester resin (X), scaly white mica which is effective to absorb vibration energy is preferable. In addition, the average particle diameter of mica in the resin composition used for the vibration damping film of the present invention should be in the range of 5 to 80 μm in order to allow easy orientation of mica dispersed in the vibration damping film (condition (II)). The average particle diameter is preferably in the range of 20 to 60 μm, more preferably in the range of 25 to 50 μm. With the average particle diameter of mica of 5 μm or more, vibration damping property can be enhanced. With the average particle diameter of 80 μm or less, film of 20 to 200 μm thickness can be easily formed. Note that the average particle diameter refers to a volume-average particle diameter (accumulated 50% particle diameter) measured by laser diffractometry (Laser diffraction/scattering particle size distribution analyzer LA-910 manufactured by HORIBA, Ltd.).

Furthermore, the content of the polyester resin (X), titanium dioxide (Y) and mica flakes (Z) in the resin composition used in the vibration damping film of the present invention should be in the range of 35 to 60% by mass, in the range of 5 to 15% by mass, and in the range of 30 to 55% by mass, respectively (condition (I)). The content of the above-mentioned polyester resin (X), titanium dioxide (Y) and mica flakes (Z) is preferably in the range of 38 to 55% by mass, in the range of 5 to 12% by mass, and in the range of 40 to 55% by mass, respectively, and more preferably in the range of 40 to 55% by mass, in the range of 5 to 10% by mass, and in the range of 45 to 55% by mass, respectively. In addition, the content of the polyester resin (X) is more preferably more than 40% by mass.

With the content of the polyester resin (X) in the resin composition used for the vibration damping film of 35% by mass or more, film of 20 to 200 μm thickness can be easily formed. With the above-mentioned content of 60% by mass or less, dispersion of titanium dioxide and mica flakes in the amount to significantly enhance the vibration damping property can be attained.

With the content of titanium dioxide (Y) in the resin composition used for the vibration damping film of 5% by mass or more, significant enhancement of the vibration damping property by titanium dioxide can be attained. With the content of titanium dioxide (Y) of 15% by mass or less, film of 20 to 200 μm thickness can be easily formed.

Furthermore, with the content of mica flakes (Z) in the resin composition used for the vibration damping film of 30% by mass or more, enhancement of the vibration damping property can be attained. With the above-mentioned content of 55% by mass or less, film of 20 to 200 μm thickness can be easily formed.

The mass ratio of titanium dioxide (Y) and mica flakes (Z) in the resin composition (titanium dioxide/mica flakes) is preferably in the range of 0.05 to 0.21, more preferably in the range of 0.08 to 0.20.

With the above-mentioned mass ratio in the range of 0.05 to 0.21, favorable balance between the above-mentioned enhancement of vibration damping property and easiness of film forming can be attained.

Although the vibration damping film of the present invention contains the above-mentioned polyester resin (X), titanium dioxide (Y) and mica flakes (Z), inorganic fillers other than titanium dioxide and mica flakes as well as one or more additives, such as, for example, dispersants, compatibility accelerators, surfactants, antistatic agents, lubricants, plasticizers, flame retardants, crosslinking agents, antioxidants, anti-aging agents, weather-resisting agents, heat-resisting agents, processing aids, brighteners, foaming agents and foaming aids may be added as needed, unless the effects of the present invention are adversely affected. In addition, blend with other resins, surface treatment after forming, or the like may be performed unless the effects of the present invention are adversely affected.

The vibration damping film of the present invention can be obtained by mixing the polyester resin (X), titanium dioxide (Y), and mica flakes (Z) as well as other components as needed followed by film forming. Known mixing methods such as, for example, melt blending using an apparatus such as a hot roll, Banbury mixer, a twin-screw kneader, an extruder, etc. can be employed. Alternatively, a method to dissolve or swell the polyester resin in a solvent and adding titanium dioxide and mica flakes followed by drying, a method to mix each component in fine powder form, etc. can be employed. Note that the method and order of adding titanium dioxide, mica flakes, additives, etc. is not particularly limited. Although the production method of the vibration damping film using the mixture is not particularly limited, the film can be suitably produced by extruding the melted mixture through a T-die into a film shape using an extruder.

Note that the thickness of the vibration damping film of the present invention is in the range of 20 to 200 μm, preferably in the range of 50 to 200 μm, more preferably in the range of 80 to 180 μm.

In the present invention, the above-mentioned constitution allows the maximum value of a loss factor of 0.15 or more, wherein the less factor is measured for an unconstrained-type test piece of a thickness ratio (thickness of vibration damping film/thickness of substrate) of 1.0 using an aluminum alloy 5052 as a substrate under the conditions of frequency of 500 Hz and measurement temperature range of 0 to 80° C. using central excitation method. The maximum value of the loss factor is preferably 0.18 or more.

In addition, since the vibration damping film of the present invention is mainly composed of polyester resin component, titanium dioxide, and mica flakes, it is lightweight and provides the excellent vibration damping property.

Furthermore, the present invention is particularly characterized by that a vibration damping film of a thickness of 20 to 200 μm is easily formed. Thus, the addition of titanium dioxide along with mica flakes to the resin component in a predetermined mass ratio not only provides a vibration damping material having a high vibration damping property but also makes it possible to disclose a method to easily produce the vibration damping film, which was not conceived previously.

In addition, since the vibration damping film of the present invention is obtained by the addition of titanium dioxide along with mica flakes to the resin component without a need to use carbon powder or the like, it can also be used with general versatility in applications and places where various color tones are required.

Accordingly, the vibration damping film of the present invention can be formed or processed into constrained-type vibration damping film, unconstrained-type vibration damping film, labels, tapes, injection-molded products, fibers, containers, foams, adhesives, paints, etc. and widely used as vibration isolators, vibration dampers, and sound-absorbing-insulating materials that can be applied to vehicles, railway cars, aircraft, ships, household appliances, office automation equipment, precision apparatuses, building equipment, civil engineering equipment, household equipment, medical devices, shoes, sports goods, etc. In addition, it can also be applied as a vibration damping label for cassette tapes, hard disks, handy cameras, digital cameras, etc. In addition, it can be particularly suitably utilized as a vibration damping film used in the application to enhance the vibration damping property of the laminated body by laminating it with a sheet-shaped prepreg composed of an uncured thermosetting resin impregnated in reinforcement fibers consisting of inorganic and/or organic fibers.

EXAMPLES

Examples are shown hereinafter. The present invention is not limited to the following examples.

The polyester resin (X) and the vibration damping film were evaluated as follows.

(1) Molar Ratio of Each Component Unit in the Polyester Resin (X): [$(A_1+B_1)/(A_0+B_0)$], ($A_1/A_0$) ($B_1/B_0$):

Calculated from the ratio of integrated values of the measured results by $^1$H-NMR spectroscopy (400 MHz, FT-NMR EX-90 manufactured by NDK, Incorporated, Measurement mode: NON ($^1$H)).

(2) Intrinsic Viscosity ([η]) of Polyester Resin (X):

Intrinsic viscosity ([η]) of the polyester resin (X) was measured using a Cannon Fenske-type viscometer for the polyester resin dissolved in a mixed solvent of trichloroethane/phenol (40/60 mass ratio) being retained at 25° C.

(3) Heat Generation Value ($\Delta H_c$) of Exothermic Peak by Crystallization under the Conditions of Decreasing Temperature of the Polyester Resin (X):

Heat generation value ($\Delta H_c$) of exothermic peak by crystallization under the conditions of decreasing temperature of the polyester resin was measured using a differential scanning calorimeter DSC/TA-50WS manufactured by Shimadzu Corporation. About 10 mg of the sample was placed in an aluminum container without sealing. Then, under a nitrogen gas flow (30 mL/min), the sample was heated to 280° C. at a temperature rise rate of 20° C./min, held at 280° C. for one minute, and then cooled at a temperature drop rate of 10° C./min . The heat generation value ($\Delta H_c$) of exothermic peak by crystallization was calculated from the area of the exothermic peak that appeared during the period of decreasing temperature.

(4) Elongation at Failure Point:

Elongation at failure point was obtained by calculating the average value of percent elongation of five tensile tests for reed shape test pieces with the dimension of 10 mm×150 mm and 1.0 mm thick under the conditions of tensile rate of 50 mm/min and the intergrip distance of 50 mm using a tensile tester (Strograph V1-C manufactured by Toyo Seiki Seisakusho, Ltd.) according to JIS K7127 after conditioning at 23° C. and 50% RH for not less than 80 hrs.

(5) Thickness of Shaped Film:

The resin composition was shaped into test pieces with the dimension of 20 mm×20 mm and about 1 mm thick, which were then preheated with a hot press at 200° C. for 3 minutes, pressed at 2 MPa for 1 minute, then cooled with a cooling press at 1 MPa for 3 minutes. After the four press treatments, thickness was evaluated by comparing the average value of the thickness of the pressed test pieces.

(6) Mold Releasability

After kneading each material at 200° C. for 15 minutes in a 60 cc kneader, the material was removed from the kneading vessel with a brass spatula. Mold releasability of the material was evaluated by whether there was a residue of the material on the blade or in the kneading vessel. When the adhesion of the material to the blade or the kneading vessel was so little as not to cause problems as an industrial production method, the material was evaluated as A. Otherwise the material was evaluated as B.

(7) Maximum Loss Factor of Vibration Damping Film:

The vibration damping film was hot-pressed into a sheet with a thickness of about 1 mm. A test piece with the dimension of 10 mm×150 mm was cut out from the sheet, which was then hot-pressed and bonded to a 1 mm thick substrate (aluminum alloy 5052) to prepare an unconstrained-type vibration damping material. The unconstrained-type vibration damping material obtained was measured for the loss factor using a loss factor tester (manufactured by Ono Sokki Co., Ltd.) at 500 Hz in the measurement temperature range of 0 to 80° C. by a central excitation method. Vibration damping ability was evaluated by comparing the maximum values of the loss factor (maximum loss factor) obtained in the above-

Example 1

A polyester production apparatus of an internal volume of 30 L and equipped with a packed fractionating column, a stirring blade, a partial condenser, a total condenser, a cold trap, a thermometer, a heater and a nitrogen gas inlet tube was charged with 10,834 g (65.3 mol) of isophthalic acid (manufactured by A.G. International Chemical Co., Inc.), 5,854 g (32.3 mol) of azelaic acid (trade name: EMEROX1144, manufactured by Cognis Co., Ltd., containing 93.3 mol % of azelaic acid and 99.97 mol % of dicarboxylic acid in total) and 11,683 g (129.6 mol) of 2-methyl-1,3-propanediol (manufactured by Dairen Chemical Corp.). The mixture was heated up to 230° C. under ordinary pressure in a nitrogen atmosphere to undergo esterification for 3.5 hours. Quantity of the water condensed and distilled off was monitored. After conversion of isophthalic acid and azelaic acid reached 85 mol % or higher, 14.9 g of titanium (IV) tetrabutoxide monomer (manufactured by Wako Pure Chemical Industries, Ltd.) (67.4 ppm of titanium concentration with respect to the total mass of initial condensation product, which was equivalent to the mass of the total loaded material minus the mass of the condensed water) was added. The temperature was gradually increased and the pressure was gradually reduced. Polycondensation was finally carried out at 240 to 250° C. and at 0.4 kPa or lower, while 2-methyl-1,3-propanediol was discharged out of the reaction system. Viscosity and stirring torque value of the reaction mixture gradually increased. The reaction was terminated when the viscosity reached an appropriate level, or when the distillation of 2-methyl-1,3-propanediol stopped.

The properties of the polyester resin obtained are as follows.

$[\eta]$: 0.72 (dL/g)
$\Delta Hc=0$ (J/g)
$^1$H-NMR [400 MHz, $CDCl_3$, internal standard TMS]: $\delta$ (ppm)=7.5 to 8.9 (Ph-H, 4H); 3.5 to 4.6 (—$CH_2$—CH ($CH_3$)—$CH_2$—, 6H); 1.0 to 2.6 (—$CH_2$CH ($CH_3$)$CH_2$—, —$CH_2$CH ($CH_3$)$CH_2$—, —$CO(CH_2)_7CO$—, 13H) ($A_1$+$B_1$)/($A_0$+$B_0$): 1.0, ($A_1$/$A_0$): 1.0, ($B_1$/$B_0$): 1.0

A mixture of 45% by mass of this polyester resin, 5% by mass of titanium dioxide powder (trade name: TIPAQUE CR-80, manufactured by ISHIHARA SANGYO KAISHA, Ltd.) and 50% by mass of mica flakes (trade name: SYA-21R, average particle diameter: 27 μm, manufactured by Yamaguchi Mica Co., Ltd.) was kneaded at 200° C. using a twin-screw kneader and extruded through a T-die into a film shape. Physical properties of the vibration damping film obtained are shown in Table 1. Note that the average particle diameter of the mica flakes in the resin composition after kneading was 22 μm.

Example 2

A mixture of 40% by mass of the polyester resin obtained in Example 1, 10% by mass of titanium dioxide powder (TIPAQUE CR-80) and 50% by mass of mica flakes (SYA-21R, average particle diameter: 27 μm) was kneaded at 200° C. using a twin-screw kneader and extruded through a T-die into a film shape. Physical properties of the vibration damping film obtained are shown in Table 1.

Example 3

A mixture of 40% by mass of the polyester resin obtained in Example 1, 5% by mass of titanium dioxide powder (TIPAQUE CR-80) and 55% by mass of mica flakes (SYA-21R, average particle diameter: 27 μm) was kneaded at 200° C. using a twin-screw kneader and extruded through a T-die into a film shape. Physical properties of the vibration damping film obtained are shown in Table 1.

Example 4

A mixture of 50% by mass of the polyester resin obtained in Example 1, 5% by mass of titanium dioxide powder (TIPAQUE CR-80) and 45% by mass of mica flakes (SYA-21R, average particle diameter: 27 μm) was kneaded at 200° C. using a twin-screw kneader and extruded through a T-die into a film shape. Physical properties of the vibration damping film obtained are shown in Table 1.

Comparative Example 1

A mixture of 36% by mass of the polyester resin obtained in Example 1, 4% by mass of titanium dioxide powder (TIPAQUE CR-80) and 60% by mass of mica flakes (SYA-21R, average particle diameter: 27 μm) was kneaded at 200° C. using a twin-screw kneader and extruded through a T-die into a film shape. Physical properties of the vibration damping film obtained are shown in Table 2.

Comparative Example 2

A mixture of 40% by mass of the polyester resin obtained in Example 1 and 60% by mass of mica flakes (SYA-21R, average particle diameter: 27 μm) was kneaded at 200° C. using a twin-screw kneader and extruded through a T-die into a film shape. Physical properties of the vibration damping film obtained are shown in Table 2.

Comparative Example 3

A mixture of 62.5% by mass of the polyester resin obtained in Example 1 and 37.5% by mass of mica flakes (SYA-21R, average particle diameter: 27 μm) was kneaded at 200° C. using a twin-screw kneader and extruded through a T-die into a film shape. Physical properties of the vibration damping film obtained are shown in Table 2.

Comparative Example 4

A mixture of 45% by mass of the polyester resin obtained in Example 1, 5% by mass of titanium dioxide powder (TIPAQUE CR-80) and 50% by mass of mica flakes (CS-060DC, average particle diameter: 200 μm, manufactured by Yamaguchi Mica Co., Ltd.) was kneaded at 200° C. using a twin-screw kneader and extruded through a T-die into a film shape. Physical properties of the vibration damping film obtained are shown in Table 2.

Comparative Example 5

A mixture of 20% by mass of the polyester resin obtained in Example 1, 20% by mass of titanium dioxide powder (TIPAQUE CR-80) and 60% by mass of mica flakes (CS-060DC, average particle diameter: 200 μm, manufactured by Yamaguchi Mica Co., Ltd.) was kneaded at 200° C. using a twin-screw kneader and extruded through a T-die into a film shape. Physical properties of the vibration damping film obtained are shown in Table 2.

TABLE 1

|  |  | Example 1 | Example 2 | Example 3 | Example 4 |
|---|---|---|---|---|---|
| Composition (% by mass) | Polyester resin (X) | 45 | 40 | 40 | 50 |
|  | Titanium dioxide (Y) | 5 | 10 | 5 | 5 |
|  | Mica SYA-21R | 50 | 50 | 55 | 45 |
|  | flakes CS-060DC (Z) | — | — | — | — |
|  | (Y)/(Z) mass ratio | 0.10 | 0.20 | 0.09 | 0.11 |
| Evaluation results | Elongation at failure point (%) | 56 | 43 | 34 | 62 |
|  | Thickness of shaped film (μm) | 121 | 156 | 179 | 97 |
|  | Mold releasability | A | A | A | A |
|  | Maximum loss factor | 0.25 | 0.23 | 0.23 | 0.24 |

TABLE 2

|  |  | Comparative Example 1 | Comparative Example 2 | Comparative Example 3 | Comparative Example 4 | Comparative Example 5 |
|---|---|---|---|---|---|---|
| Composition (% by mass) | Polyester resin (X) | 36 | 40 | 62.5 | 45 | 20 |
|  | Titanium dioxide (Y) | 4 | — | — | 5 | 20 |
|  | Mica SYA-21R | 60 | 60 | 37.5 | — | — |
|  | flakes CS-060DC (Z) | — | — | — | 50 | 60 |
|  | (Y)/(Z) mass ratio | 0.07 | — | — | 0.10 | 0.33 |
| Evaluation results | Elongation at failure point (%) | 12 | 25 | 78 | 7 | 6 |
|  | Thickness of shaped film (μm) | 228 | 204 | 65 | 298 | 310 |
|  | Mold releasability | A | A | B | A | A |
|  | Maximum loss factor | 0.18 | 0.20 | 0.16 | 0.24 | 0.28 |

Table 1 and Table 2 show that the vibration damping film of the present invention has a high maximum loss factor and the excellent vibration damping property and that the film of thickness of not more than 200 μm can be molded if the elongation at failure point is in the range of 30 to 70%.

Although the vibration damping film of Comparative Examples has a maximum loss factor not less than 0.15 (Comparative Examples 1 to 5), the processability and the mold releasability are not satisfactory and no film was obtained. Therefore, the vibration damping film of the thickness not more than 200 μm which exhibits the excellent vibration damping property can be easily produced according to the present invention.

[Industrial Applicability]

The vibration damping film of the present invention can be easily shaped into a thickness of 20 to 200 μm. The film is lightweight and has the excellent vibration damping property. Furthermore, since the vibration damping film of the present invention contains titanium dioxide and mica flakes and does not need to use carbon powder and the like, it can be used with general versatility in applications and places where various color tones are required. Therefore, the vibration damping film of the present invention can be widely used for places where vibration occurs, such as vehicles, railway cars, aircraft, ships, household appliances, office automation equipment, precision apparatuses, building equipment, civil engineering equipment, household equipment, medical devices, shoes, sports goods, etc. In addition, the vibration damping film of the present invention can be applied as a vibration damping label for cassette tapes, hard disks, handy cameras, digital cameras, etc.

The invention claimed is:

1. A vibration damping film comprising a resin composition obtained by dispersing titanium dioxide (Y) and mica flakes (Z) in a polyester resin (X) composed of a dicarboxylic acid constitutional units and a diol constitutional units,
   wherein said resin composition satisfies all of the following conditions (I) to (III), and
   wherein the film has a thickness in the range of 20 to 200 μm:
   (I) Content of polyester resin (X), titanium dioxide (Y) and mica flakes (Z) in the resin composition is in the range of 35 to 60% by mass, in the range of 5 to 15% by mass and in the range of 30 to 55% by mass, respectively,
   (II) Average particle diameter of the mica flakes (Z) in the resin composition is in the range of 5 to 80 μm, and
   (III) Elongation at failure point of the resin composition measured according to JIS K7127 is in the range of 30 to 70%.

2. The vibration damping film according to claim 1, wherein the mass ratio of titanium dioxide (Y) and mica flakes (Z) in said resin composition (titanium dioxide/mica flakes) is in the range of 0.05 to 0.21.

3. The vibration damping film according to claim 1, wherein the ratio of a total of the number of the dicarboxylic acid constitutional units having an odd number of carbon atoms in the main chain ($A_1$) plus the number of the diol constitutional units having an odd number of carbon atoms in the main chain ($B_1$) with respect to a total of the number of total dicarboxylic acid constitutional units ($A_0$) plus the number of total diol constitutional units ($B_0$), i.e., $[(A_1+B_1)/(A_0+B_0)]$ is in the range of 0.5 to 1.0.

4. The vibration damping film according to claim 3, wherein the dicarboxylic acid constitutional unit having an odd number of carbon atoms in the main chain in the polyester resin (X) is constitutional unit derived from a dicarboxylic acid selected from the group consisting of isophthalic acid, malonic acid, glutaric acid, pimelic acid, azelaic acid, undecanedioic acid, brassylic acid and 1,3-cyclohexanedicarboxylic acid.

5. The vibration damping film according to claim 3, wherein the dicarboxylic acid constitutional unit having an odd number of carbon atoms in the main chain in the polyester resin (X) is at least either of the constitutional unit derived from isophthalic acid or azelaic acid.

6. The vibration damping film according to claim 3, wherein the ratio ($A_1/A_0$) of the number of the dicarboxylic acid constitutional units having an odd number of carbon atoms in the main chain ($A_1$) with respect to the number of total dicarboxylic acid constitutional units ($A_0$) in the polyester resin (X) is in the range of 0.5 to 1.0.

7. The vibration damping film according to claim 3, wherein the diol constitutional unit having an odd number of carbon atoms in the main chain in the polyester resin (X) is constitutional unit derived from a diol selected from the group consisting of 1,3-propanediol, 1,3-butanediol, 2-methyl-1,3-propanediol, neopentyl glycol, 1,5-pentanediol, m-xylene glycol and 1,3-cyclohexanediol.

8. The vibration damping film according to claim 3, wherein the diol constitutional unit having an odd number of carbon atoms in the main chain in the polyester resin (X) is constitutional unit derived from a diol selected from the group consisting of 1,3-propanediol, 1,5-pentanediol, 2-methyl-1,3-propanediol, 1,3-butanediol and neopentyl glycol.

9. The vibration damping film according to claim 3, wherein the ratio ($B_1/B_0$) of the number of the diol constitutional units having an odd number of carbon atoms in the main chain ($B_1$) with respect to the number of total diol constitutional units ($B_0$) in the polyester resin (X) is in the range of 0.5 to 1.0.

10. The vibration damping film according to claim 1, wherein the polyester resin (X) has the intrinsic viscosity measured in a mixed solvent of trichloroethane and phenol (mass ratio of the mixture: trichloroethane/phenol=40/60) at 25° C. in the range of 0.2 to 2.0 dL/g (1) and has the heat generation value based on the exothermic peak by crystallization under the conditions of decreasing temperature measured with a differential scanning calorimeter of 5 J/g or less (2).

11. The vibration damping film according to claim 1, having the maximum value of a loss factor of 0.15 or more, wherein the loss factor is measured for an unconstrained-type test piece of a thickness ratio (thickness of vibration damping film/thickness of substrate) of 1.0 using an aluminum alloy 5052 as a substrate under the condition of frequency of 500 Hz and measurement temperature range of 0 to 80° C. using central excitation method.

* * * * *